No. 773,966. PATENTED NOV. 1, 1904.
D. P. McQUEEN.
WHEEL.
APPLICATION FILED JULY 25, 1904.
NO MODEL.
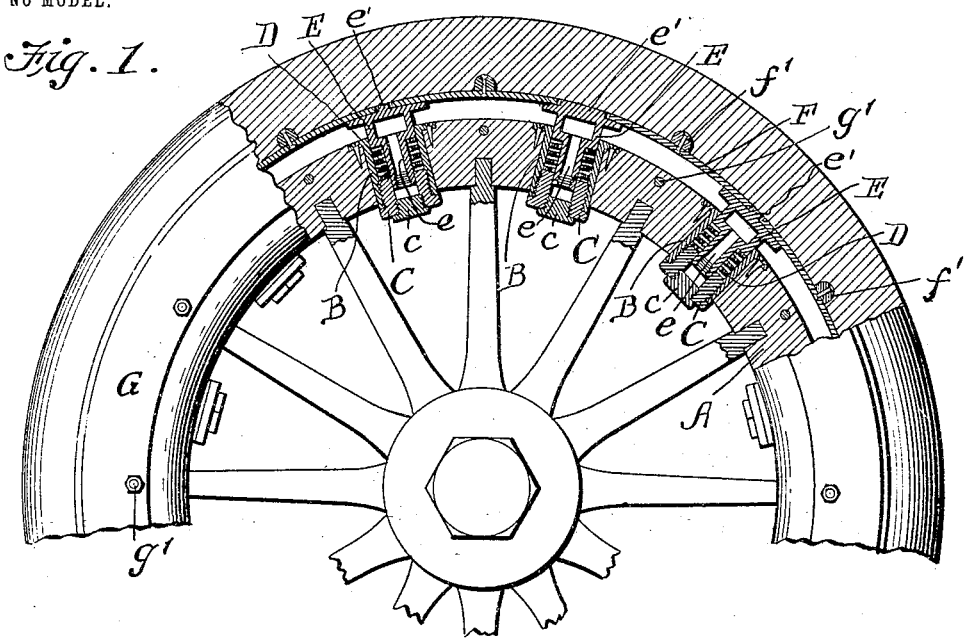
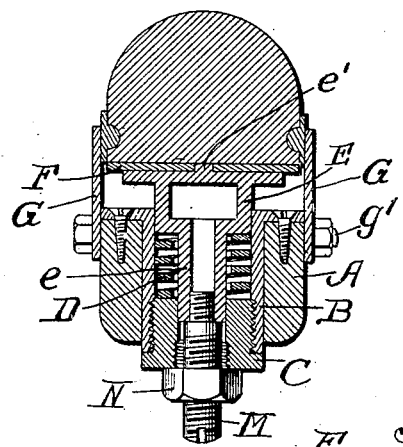
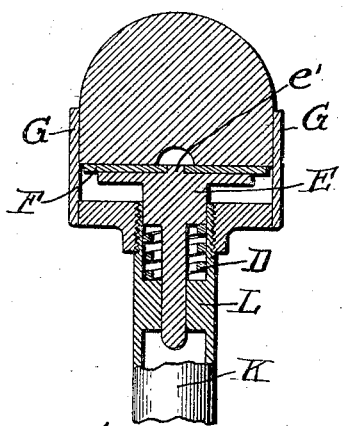
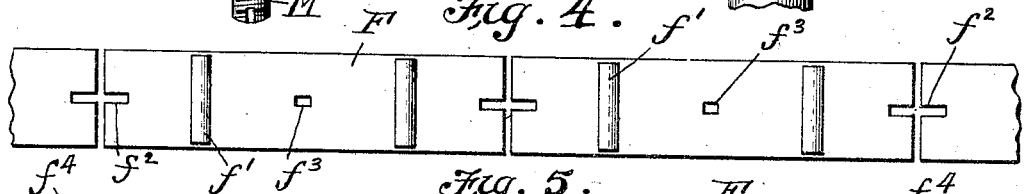
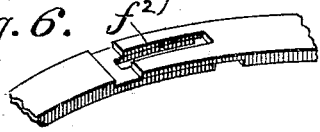
Witnesses
Ernest Pulsford
Inventor
D. P. McQueen.
By his Attorneys
Baldwin & Wright No. 773,966. Patented November 1, 1904.

UNITED STATES PATENT OFFICE.

DANIEL P. McQUEEN, OF SARATOGA SPRINGS, NEW YORK.

WHEEL.

SPECIFICATION forming part of Letters Patent No. 773,966, dated November 1, 1904.

Application filed July 25, 1904. Serial No. 217,984. (No model.)

*To all whom it may concern:*

Be it known that I, DANIEL P. MCQUEEN, a citizen of the United States, residing at Saratoga Springs, in the county of Saratoga and State of New York, have invented certain new and useful Improvements in Wheels, of which the following is a specification.

My invention relates to that class of wheels which is used to support carriages, wagons, motor-vehicles, and the like. The wheels put to this use must be strong and adapted to stand hard usage and at the same time of such construction that they will yield to the inequalities of the roadway, so as to relieve the running-gear of undue strain and also promote the comfort of the occupants and safety of contents of the vehicle by freeing them from irregular jolts and jars. To this end pneumatic tires are very generally used; but there are numerous disadvantages incident to the use of such tires. Their original cost is large, their life is short, and they require frequent replenishing of the air within. They are subject at inopportune moments to be punctured, thereby causing troublesome and often expensive delays.

The object of my invention is to provide as a substitute for a pneumatic-tired wheel a wheel having a cheap and lasting cushioned tire which may be put to any use to which either a solid or a pneumatic-tired wheel is at present used.

To this end my wheel consists of a rigid inner wheel surrounded by an elastic tire carried on a stiff rim supported by a series of plungers resting on coiled springs set in sockets in the periphery of the inner wheel. I take a wheel as ordinarily constructed and bore radial holes at regular distances through its rim. Into each of these I insert a metallic bushing from the outside, and into the inner end of this bushing I screw an annular plug. On the outer end of this plug I place a coiled spring of great strength and on this place a plunger. The stem of the plunger extends through the spring and into the central aperture of the plug. On the head of the plunger is a projection adapted to engage a corresponding opening in the tire-bearing rim, on which is held, by means of cross-ribs, a solid tire of some plastic material, preferably rubber. The recess between the felly of the inner wheel and the tire-supporting rim is closed by two annular rings, one placed on either side of the wheel and held in position by bolts passed through them and the felly of the inner wheel. To relieve the pressure of the springs from the tire-supporting rim while the tire is being taken off or put on, I provide a bolt threaded throughout its length, one end of which is adapted to engage the inner end of the stem of the plunger. The bolt is inserted through the aperture in the plug and screwed to the stem of the plunger, and then a nut of larger diameter than the aperture is screwed on the bolt, thus drawing in the head of the plunger and compressing the spring.

Instead of using a bushing to contain the spring and plunger I may use a metallic wheel with hollow spokes and insert the spring and plunger in the outer end of these spokes.

In the accompanying drawings, Figure 1 is a view, partly in longitudinal section, of one form of my improved wheel. Fig. 2 is a transverse section through one of the bushings with the spring-depressing bolt in position. Fig. 3 is a similar section through one of the spring-sockets formed in the end of a hollow spoke. Fig. 4 shows in plan a portion of one style of tire-supporting rim. Fig. 5 shows in plan a portion of another form of tire-supporting rim. Fig. 6 shows in perspective the junction of the two ends of the rim shown in Fig. 5.

The hub and spokes of the wheel may be of any well-known construction, and the rim A of the inner wheel may be of any ordinary construction. Into this rim at suitable intervals are inserted bushings B, which are held in place by screws or by any other well-known means. The inner ends of the bushings are provided on their interior with screw-threads with which engage exteriorly-screw-threaded annular plugs C, into which screw solid plugs *c*. It will be seen that these annular plugs form shoulders within the bushings, and on these shoulders are heavy coiled springs D, which extend almost to the outer end of the bushings. On these springs rest the heads of plungers E, which are preferably very nearly of the same section as the interior of the bushings. The stems $e$ of these plungers extend through the springs and down into the central openings through the annular plugs C, which act as guideways for the plunger-stems. On the heads of the plungers are projections $e'$.

When I use a tire-supporting rim F of the form shown in Fig. 4, the projections $e'$ on the heads of each alternate plunger will be square in cross-section, so as to fit into the sockets $f^3$, while the head of each other plunger will be provided with a longitudinal projection on which fit the slots $f^2$, so as to leave room for the expansion and contraction of the tire-supporting rim as the springs are compressed or expanded.

When I use the form of rim shown in Figs. 5 and 6, the projections on the heads of the plungers will all be square, so as to engage loosely the elongated apertures $f^4$ in the rim, with the exception of one projection, which will be longitudinal, so as to be engaged by the sockets $f^2$ at the ends of the rim, at which place most of the play for the entire circumference of the wheel caused by the expanding and contracting of the springs will come. The tire-supporting rim is provided at intervals with transverse lugs $f'$ to prevent the tire from slipping circumferentially. These lugs may be either cast on the rim or made of separate pieces and riveted on, as shown in Fig. 1. Annular bands G extend from the felly of the inner wheel to the tire and serve the double purpose of holding the tire from sliding laterally and of keeping free of dust and dirt the space between the felly of the inner wheel and the tire-supporting rim. These bands may be held in position by bolts $g'$, which pass through the felly of the inner wheel and the annular bands.

When it becomes necessary or desirable to remove the tire, the central plugs $c$ are removed and the small ends of bolts M are screwed into the ends of the stems $e$ of the plungers. Then nuts N are screwed onto the ends of the bolts M until they rest upon the plugs C. When in this position, it is obvious that any tightening of the nuts on the bolts will cause the inner ends of the bolts, and consequently the heads of the plungers, to be drawn in toward the center of the wheel, and thus the springs D will be depressed and the tire-supporting rim relieved from the pressure and the tire loosened, so as to be readily removed. The nuts on the bolts which hold the annular bands G may be removed and one band taken off. The tire then may be easily slipped off.

In Fig. 3 I have shown a structure which I prefer to use when the wheel is made wholly of metal, and the spokes can be made hollow. A hollow spoke K has cast in its interior near the outer end an annular shoulder L, on which rests the spring D and through which passes the stem of the plunger E, which in turn rests upon the spring D and supports the rim F, on which the tire rests. In this arrangement the bands G, which hold the tire from lateral displacement, may be either cast integrally with the felly on the inner wheel or may be bolted thereto.

It will be seen that I have produced a wheel which will be as easy-going and as comfortable to ride upon as the pneumatic-tired wheel and one about which there is very little to get out of order. The wheel is so built that all portions are of easy access. One or more of the plugs may be removed at any time and the springs taken out without deranging the rest of the wheel, or the tire may be very readily removed.

I claim as my invention—

1. The combination of an inner wheel provided with radial spoke-sockets, springs in said sockets, an endwise-expansible sectional tire-supporting rim surrounding the inner wheel, plungers detachably connected with said rim and slidable longitudinally therein and stems on the plungers extending through the springs and which are guided at the inner ends of the sockets.

2. The combination of an inner wheel provided with radial spoke-sockets, springs in said sockets, an endwise-expansible tire-supporting rim surrounding the inner wheel, plungers detachably connected with said rim and having stems extending through the springs and which are guided at the inner ends of the sockets and a side plate G detachably connected with the inner wheel.

3. The combination of an inner wheel, radially-open bushings in its felly, removable annular plugs in the inner ends of the bushings forming shoulders therein, coil-springs resting on the shoulders, removable solid plugs in the openings of the annular plugs, plungers resting on the springs, and a series of segmental portions of a tire-supporting rim carried by the plungers.

4. The combination of an inner wheel, radially-open bushings in its felly, removable annular plugs in the inner ends of the bushings forming shoulders therein, coil-springs resting on the shoulders, removable solid plugs in the openings of the annular plugs, plungers resting on the springs and having stems extending through the springs and into the openings of the annular plugs, and a tire-supporting rim carried by the plungers.

5. The combination of an inner wheel, radially-open bushings in its felly, removable annular plugs in the inner ends of the bushings forming shoulders therein, coil-springs resting on the shoulders, removable solid plugs in the openings of the annular plugs, plungers resting on the springs and having stems extending through the springs and into the openings of the annular plugs, a tire-supporting rim carried by the plungers, transverse ribs on the tire-supporting rim to hold the tire from circumferential movement.

6. The combination of an inner wheel, radially-open bushings in its felly, removable annular plugs in the inner ends of the bushings forming shoulders therein, coil-springs resting on the shoulders, removable solid plugs in the openings of the annular plugs, plungers resting on the springs and having stems extending through the springs and into the openings of the annular plugs and adapted to be engaged by bolts depressing the springs, a tire-supporting rim carried by the plungers, transverse ribs on the tire-supporting rim to hold the tire from circumferential movement, and removable annular guide-plates to hold the tire from lateral displacement.

7. The combination of an inner wheel, springs in its felly, plungers on the springs, projections on the heads of the plungers adapted to engage corresponding openings in a tire-supporting rim, a tire-supporting rim and a bolt engaging the plunger and adapted to depress the spring.

8. The combination of an inner wheel, springs in its felly, plungers on the springs, projections on the heads of the plungers adapted to engage corresponding openings in a tire-supporting rim, an expansible tire-supporting rim provided with suitable recesses to engage the projections on the plunger-heads, transverse ribs on the tire-supporting rims to hold the tire from circumferential movement and removable annular guide-plates to hold the tire from lateral displacement.

In testimony whereof I have hereunto subscribed my name.

DANIEL P. McQUEEN.

Witnesses:
   ALFRED SEYMOUR,
   WALTER H. COGAN.